Patented Oct. 8, 1940

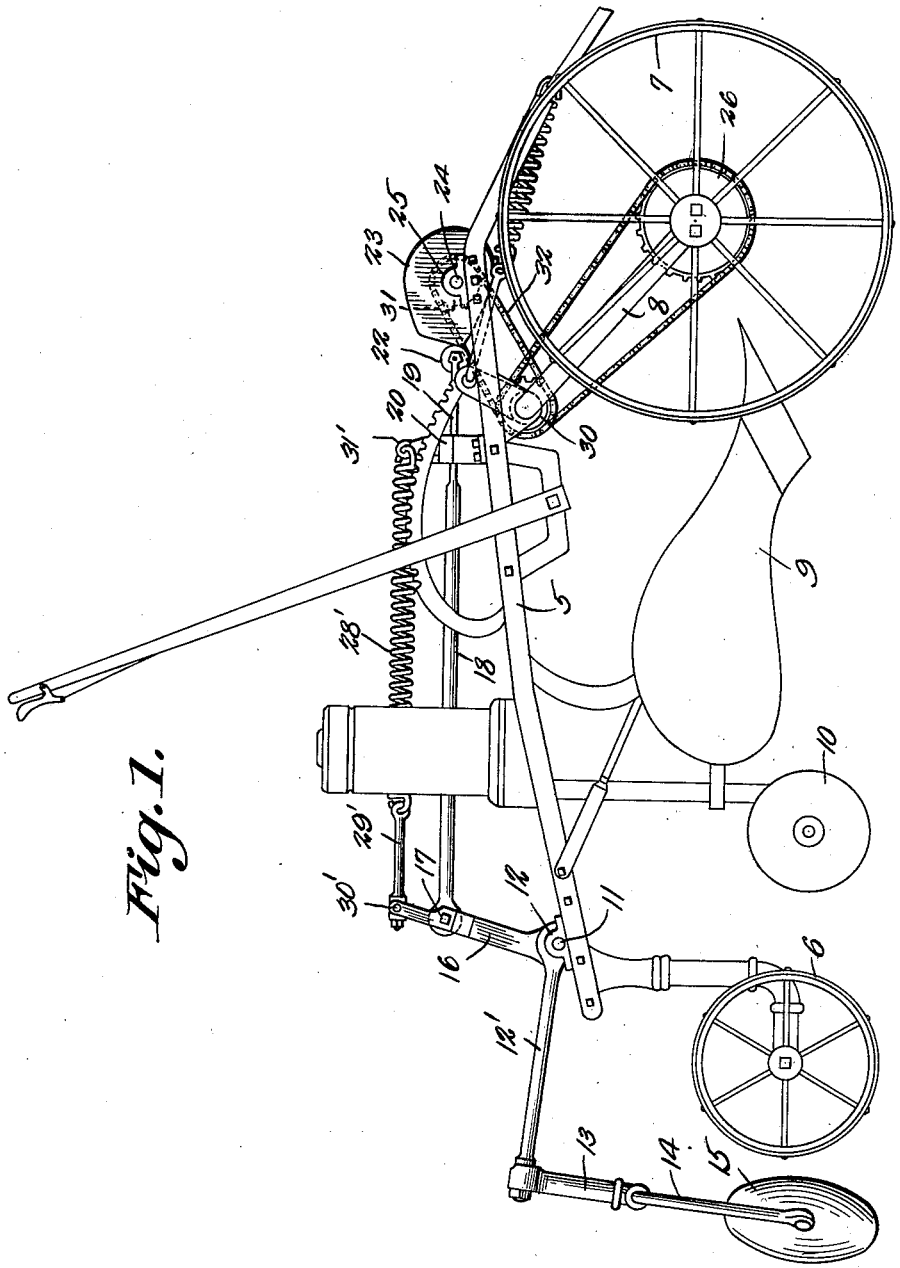

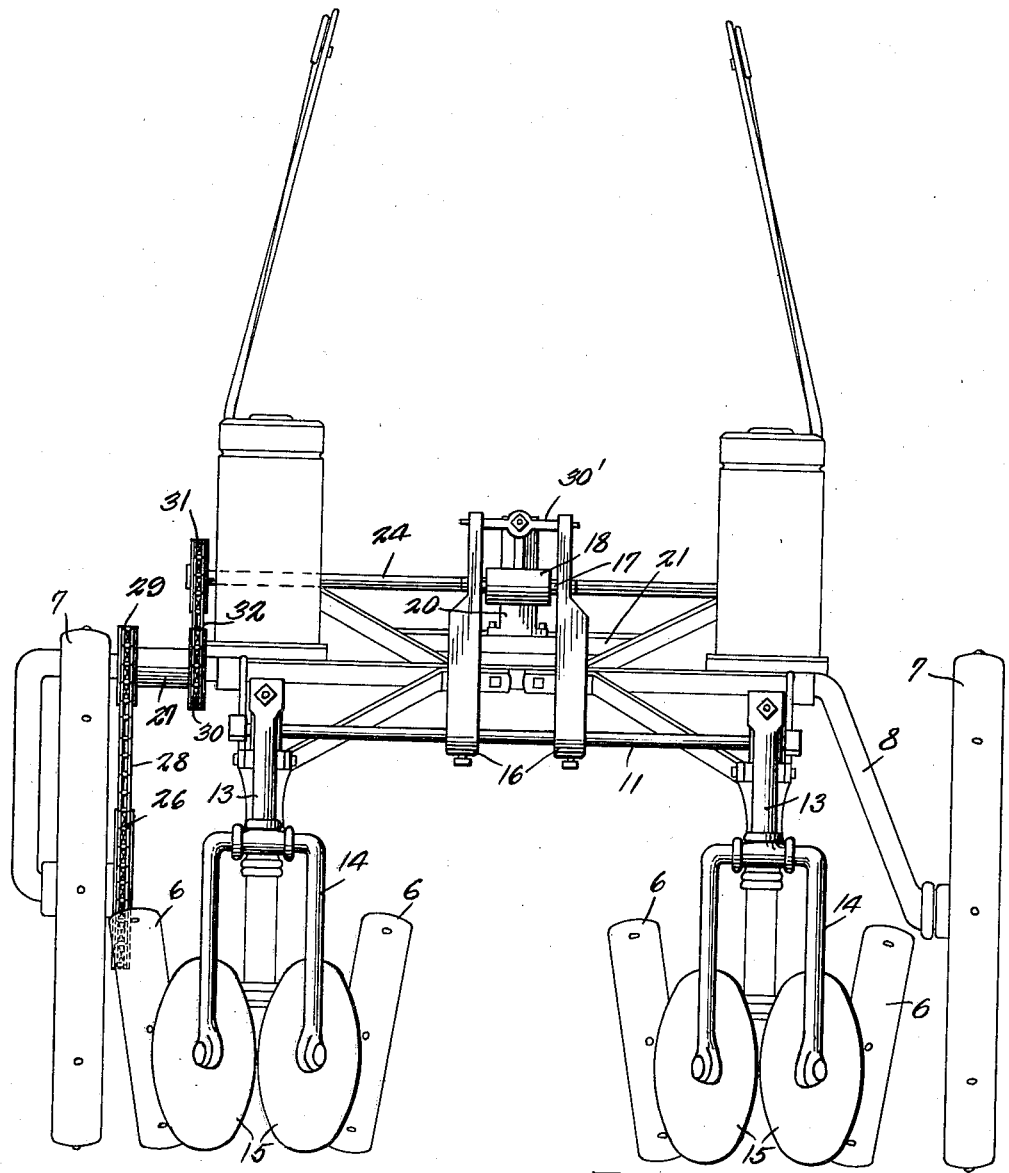

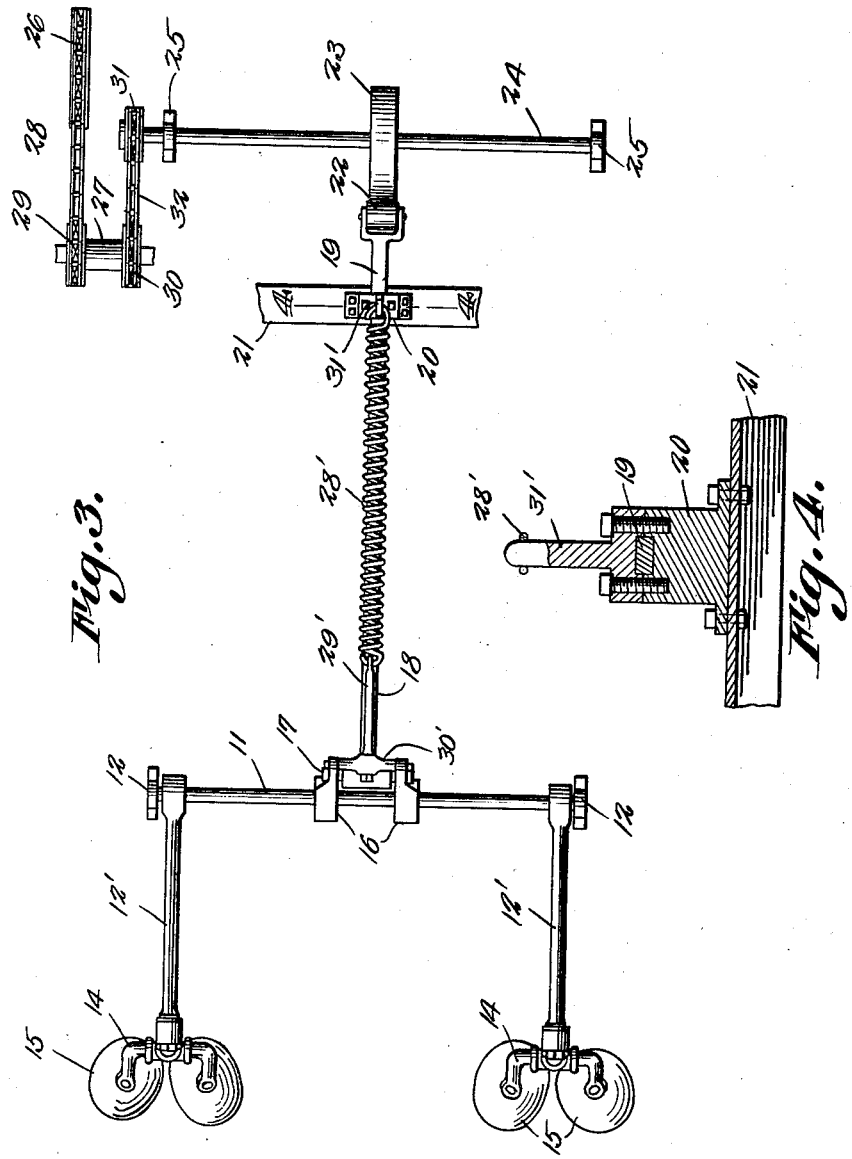

2,217,381

UNITED STATES PATENT OFFICE 2,217,381

LISTER FURROW DAMMER

Ralph H. Poor, Fort Collins, Colo.

Application June 5, 1940, Serial No. 339,020

3 Claims. (Cl. 97—55)

This invention has reference to agricultural machines, and aims to provide an attachment for use in connection with listers, the primary object of the invention being to provide means for forming dams in the furrows formed by the lister, for irrigating purposes.

An important object of the invention is to provide a device of this character including pivoted dam-forming members adapted to be intermittently moved into and out of the furrows over which the machine is moving, forming dams throughout the length of the furrows, the dams being predetermined distances apart.

A still further object of the invention is to provide an attachment of this character which may be readily and easily mounted on the usual lister, without the necessity of making extensive alterations in the usual lister construction to mount the device.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a side elevational view of a lister equipped with a dam-forming attachment constructed in accordance with the invention.

Figure 2 is a rear elevational view thereof.

Figure 3 is a plan view of the attachment.

Figure 4 is a sectional view taken on line 4—4 of Figure 3.

Referring to the drawings in detail, the reference character 5 designates the usual side rails of a lister, to which the attachment is connected.

The rear end of the lister frame is supported by means of the wheel 6, while the forward end of the frame is supported by means of the substantially large wheels 7, the wheels 7 being supported on the substantially U-shaped swinging shaft 8, by means of which the frame of the lister may be elevated or lowered, to adjust the depth of operation of the lister 9, in the usual and well known manner.

Disks 10 are supported at the rear of the listers 9, and act to spread the soil over seed in the furrows formed by the listers.

The attachment comprises a shaft 11 mounted in bearings 12 that are secured to the frame of the lister, the shaft 11 providing a support for the arms 12, which have their forward ends secured to the shaft 11, to rotate therewith. These arms 12 are secured to the shaft 11, near the ends thereof, and connect with the downwardly extended arms 13 which have connection with the inverted U-shaped members 14 that carry the dam-forming disks 15, at their ends.

As clearly shown by the drawings, these disks 15 are arranged in pairs, and are disposed at oblique angles with respect to each other, so that they will move into a furrow to extend across the entire width of the furrow.

Secured to the shaft 11, and disposed at a point intermediate its ends, are upwardly extended arms 16, the arms being secured to the shaft 11, to move therewith. Bearing openings are formed in the arms 16 to receive the shaft 17 to which the rod 18 is connected, the rod 18 having a reduced portion 19 that operates through the bearing 20 formed on the bar 21, forming a part of the lister frame. A roller indicated by the reference character 22 is mounted at the forward end of the rod 18 and is adapted to engage the edge of the cam 23 that is secured to the shaft 24 which in turn is mounted in bearings 25 carried by the lister frame.

A sprocket indicated by the reference character 26 is secured to the hub of one of the wheels 7, and transmits movement to the shaft 27, through the medium of the chain 28 that moves over the sprocket 29, secured to said shaft 27. A sprocket 30 also secured to the shaft 27, transmits movement to the sprocket 31, through the chain 32. Thus it will be seen that due to the construction shown and described, with each complete rotation of the cam 23, the rod 18 is moved rearwardly with the result that the dam-forming disks are moved downwardly scraping the walls of the furrow causing dirt to pile in the formation of a dam within the furrow. As the low side of the cam moves into engagement with the roller 22, it is obvious that the rod 18 will be moved in the reverse direction, elevating the dam-forming disks 15. This reverse movement of the rod 18 is caused by the action of the coiled spring 28 which has one end thereof connected with the rod 29 that has pivotal connection with the upper ends of the arms 16, at 30. The forward end of the spring 28 is hooked into the bracket 31 that is secured to the bearing 20.

What is claimed is:

1. A machine for forming dams comprising a wheel-supported frame, a pivoted shaft on the frame, arms secured to the shaft, a sliding rod connected with one of said arms, a roller mounted at the forward end of the rod, a cam engaging the roller and adapted to move the rod and arms in one direction, dam-forming disks, means for connecting the dam-forming disks to one of said arms, and means for moving the arms and rod in the opposite direction elevating the dam-forming disks.

2. A machine for forming dams, comprising a wheel-supported frame, a shaft mounted on the frame, an upwardly extended arm on the shaft, a rearwardly extended arm on the shaft, an arm connected with the rearwardly extended arm, damming disks connected with the latter arm, a rod having pivotal connection with the arm extending upwardly from the shaft, and extending to a point adjacent to the front end of the frame, a cam on the frame and engaging one end of the rod moving the rod rearwardly and forcing the damming disks into the ground surface, and a coiled spring for returning the dam-forming disks to their inactive positions.

3. A machine for forming dams in a furrow, comprising a frame, a pivoted arm mounted on the frame, dam-forming disks mounted on the arm, a slidable arm on the frame and adapted to swing the pivoted arm vertically, and a cam on the frame and engaging the slidable arm, at predetermined intervals, raising and lowering the dam-forming disks, forming dams.

RALPH H. POOR.